Oct. 5, 1965  R. J. MILLENAAR  3,209,396
SAUSAGE LINKING APPARATUS
Filed Jan. 27, 1964  2 Sheets-Sheet 1
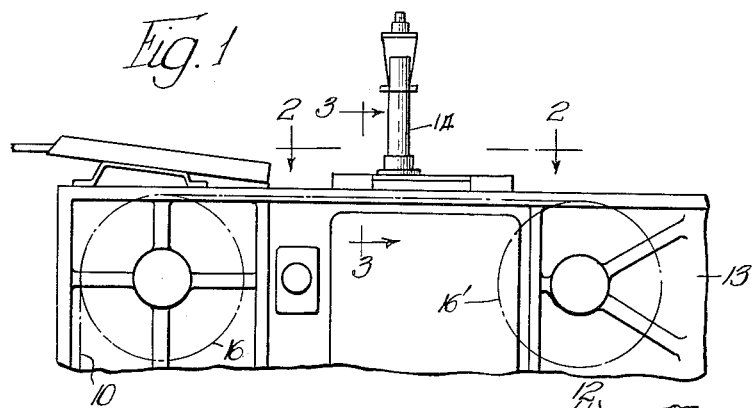
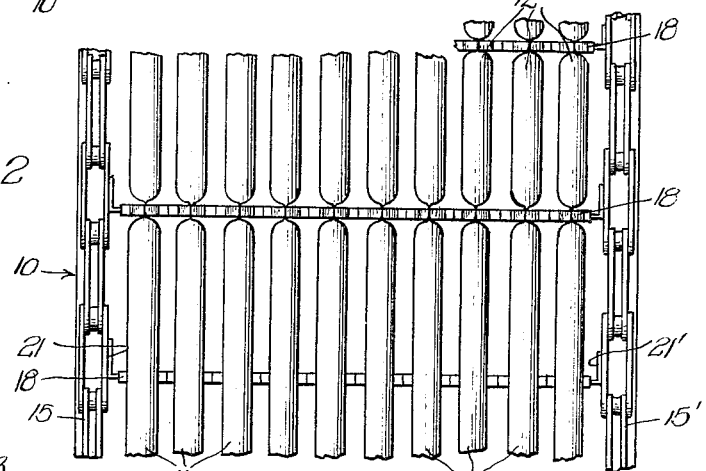
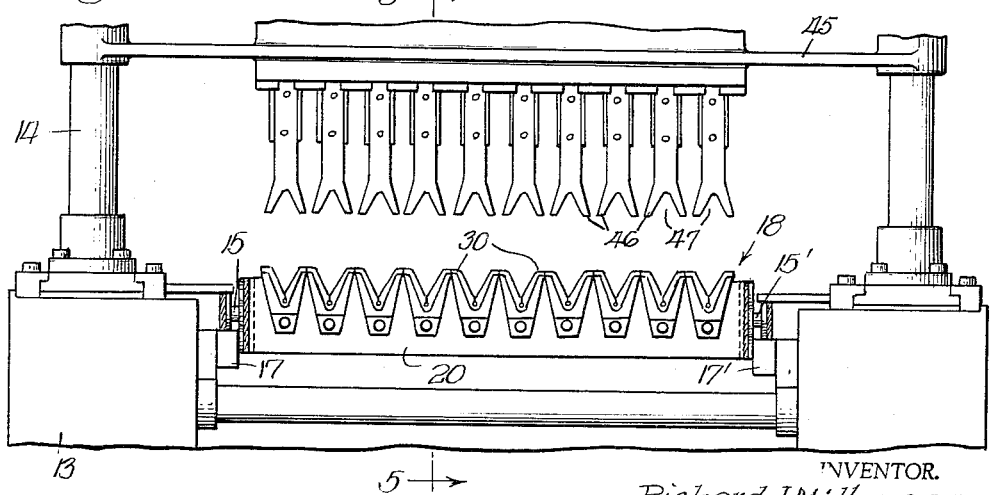
INVENTOR.
Richard J. Millenaar,
BY
Treist, Lockwood, Greenawalt & Drury
ATTYS.

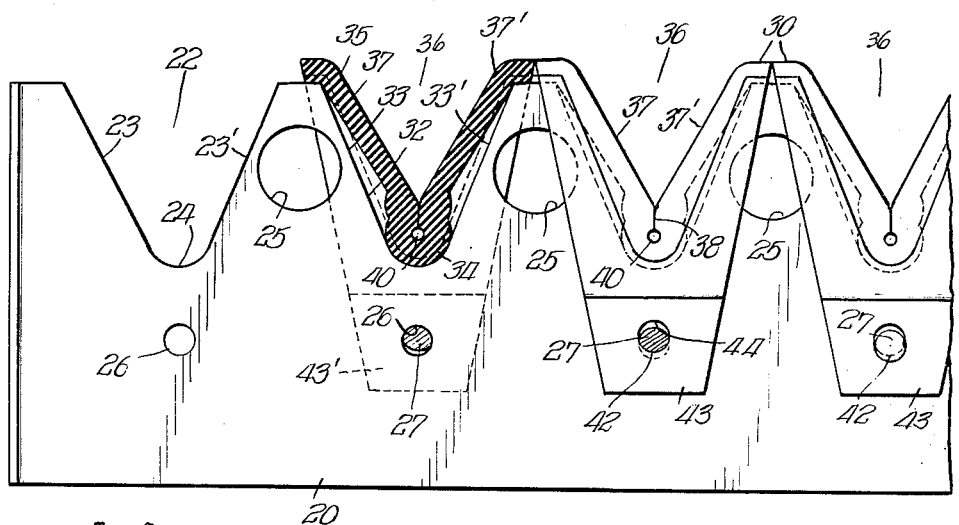

United States Patent Office 3,209,396
Patented Oct. 5, 1965

3,209,396
SAUSAGE LINKING APPARATUS
Richard J. Millenaar, Charlottesville, Va., assignor to Oscar Mayer & Co., Inc., Chicago, Ill., a corporation of Illinois
Filed Jan. 27, 1964, Ser. No. 340,237
7 Claims. (Cl. 17—34)

This invention relates to the manufacture of sausages wherein relatively long lengths of filled or stuffed casings are divided into links by constricting the casing at intervals corresponding to the desired length of the sausages and thereafter the links are carried in connected relation through a series of processing chambers where they are smoked and cooked.

It is a general object of the invention to provide an improved apparatus for dividing a stuffed sausage casing into link forming lengths which apparatus is suitable for incorporation in a sausage linking and processing machine of the type disclosed in co-pending application Serial No. 185,167, filed April 4, 1962, and in Patent No. 3,059,272, dated October 23, 1962.

It is a more specific object of the invention to provide in a sausage linking and conveying apparatus wherein a plurality of lengths of stuffed casing are fed in parallel paths to a traveling conveyor on which the casings are divided into link forming sections and advanced to processing apparatus, a linking bar assembly for the conveyor which is constructed with a plurality of separable casing constricting and holding devices so that when an individual device is damaged or there is any malfunctioning thereof it may be readily removed or replaced without any need for removing from the conveyor the entire linking bar assembly.

It is a still further object of the invention to provide a sausage linking machine having a link supporting and carrying conveyor comprising a series of longitudinally spaced cross bars, each of which has a plurality of casing constricting devices thereon so as to adapt the conveyor to multiple line linking and carrying operations, with the casing constricting devices being individually mounted on the cross bars so that they are readily removable and replaced without any dismantling of the conveyor or removing of the cross bars on which the constricting devices are supported.

These and other objects and advantages of the invention will be apparent from a consideration of the apparatus which is shown by way of illustration in the accompanying drawings wherein:

FIGURE 1 is an elevation of a portion of a sausage linking and conveying apparatus which embodies the principal features of the invention, the apparatus being shown in part diagrammatically;

FIGURE 2 is a transverse view taken generally on the line 2—2 of FIGURE 1, to an enlarged scale and with portions omitted, the view showing the sausage linking and carrying conveyor;

FIGURE 3 is a cross section taken generally on the line 3—3 of FIGURE 1, to an enlarged scale and with portions broken away, the view illustrating one of the link forming bar assemblies and associated mechanism;

FIGURE 4 is a fragmentary elevational view, to an enlarged scale and with portions broken away, of an end portion of one of the cross bar assemblies;

FIGURE 5 is a fragmentary cross section, to an enlarged scale, taken on the line 5—5 of FIGURE 3;

FIGURE 6 is a fragmentary cross section similar to FIGURE 5 with the members in a different position; and FIGURE 7 is a perspective view of one of the casing constricting devices removed from the supporting cross bar.

Referring to the drawings, there is illustrated a portion of a continuously traveling endless chain conveyor 10 (FIGURE 1) which forms a link receiving and supporting conveyor for an apparatus which is adapted to divide a plurality of lengths of stuffed sausage casings 11 (FIGURE 2) into link forming sections 12 and thereafter process the sausage links in a continuous operation. The conveyor 10 is an improvement over a similar conveyor in the link forming and processing apparatus illustrated in co-pending application Serial No. 185,167, filed April 4, 1962, which may be referred to for details of the apparatus not hereinafter described.

The conveyor 10 has a horizontally disposed upper run or stretch at one end of the apparatus which is supported on an upright frame 13 (FIGURES 1 to 3), the latter also supporting a vertically extending frame 14 above the upper run of the conveyor 10 on which there is mounted for vertical reciprocation a plurality of devices which cooperate with casing constricting and gathering devices on the conveyor 10 for dividing each of a plurality of lengths of stuffed sausage casings 11, which are fed thereto in parallel, laterally spaced relation, into a connected series of link forming sections 12, the latter being held on the conveyor 10 and subsequently carried through processing chamber or chambers by advancing movement of the conveyor 10.

The conveyor 10 (FIGURES 2 and 3) in which the sausage links 12 are formed and carried, comprises a pair of endless chains 15 and 15' which are arranged in transversely spaced, parallel relation and supported on suitable sprockets spaced throughout the apparatus, two of the sprockets being shown at 16 and 16' in FIGURE 1. The chains 15 and 15' are supported on guide rails 17 and 17' on the sides of the support frame 13 at the linking station (FIGURES 1 and 3) where the upper run of the conveyor 10 travels in a horizontal path. A plurality of cross bar assemblies 18 are carried between the chains 15 and 15' in longitudinally spaced relation with the spacing between the assemblies 18 corresponding to the length desired for the links 12. Each of the cross bar assemblies 18 comprises a single plate-like support bar 20 (FIGURES 3 to 6) which is attached at its opposite ends to the chains 15 and 15' by the angle brackets 21 and 21'. The support bars 20 are arranged in transversely extending, parallel relation on the chains 15 and 15' and are spaced longitudinally according to the size desired for the links 12.

Each of the support bars 20 (FIGURES 3 to 6) has a plurality of notches cut in its outer margin to provide a plurality of spaced upwardly opening, generally V-shaped slots 22. Each of the notches or slots 22 is defined by downwardly converging edges or sides 23 and 23' which terminate in spaced relation at the upper edges of a U-shaped or semi-circular bottom pocket formation 24. Circular holes 25 are cut in the bar 20 between each of the slots 22 so as to reduce the weight of the bar and improve circulation of air during processing. A small hole 26 is cut in the bar 20, below the bottom edge of each of the slots 22. The holes 26 are adapted to receive buttons or pins 27 for retaining on the bar 20 casing constricting devices 30.

Each of the casing constricting devices 30 (FIGURES 3 to 6) includes a pair of relatively thin, generally V-shaped metal plates 31 and 31' which are spaced apart a distance sufficient to accommodate the thickness of the cross bar 20. Each of the metal plates 31 and 31' is provided with an upwardly opening V-shaped slot 32, the downwardly converging side edges 33 and 33' of the slot terminating at a semi-circular section 34 at the bottom thereof. The plates 31 and 31' are positioned so that the V-shaped slots are aligned laterally and the upper portions of the plates which form the legs of the V-shape are encased in a rubber jacket 35 which is molded thereon so as to provide an upwardly opening slot 36 of V-shape with downwardly converging side walls or edges 37 and 37' which are at a slightly different inclination from the walls or edges 33 and 33' of the slot 32 in the plates 31 and 31'. The walls or edges 37 and 37' terminate at the bottom at a slit 38 which extends vertically from the bottom ends of the walls 37 and 37' to a small circular pocket 40 at the bottom end of the slit 38. The edge walls 37 and 37' extend between relatively flat outer side faces and have a thickness in the area between the plates 31 and 31' and the jacket material around the slit 38 and pocket 40 is formed, as shown in FIGURE 4, so as to permit distortion of the edge walls 37 and 37' in the direction of the edges 33 and 33' of the plates 31 and 31' sufficient to allow gathered portions 41 (FIGURE 6) of the casing to pass through the slit 38 and into the pocket 40 where it is frictionally retained during the travel of the conveyor through the processing chambers after which it is forced out of the same to release the sausages. The slit 38 extends through the top side wall of the pocket 40 and forms a passageway between the slot 36 and the pocket 40. Each constricting device 30 is adapted to be frictionally held in position on the support plate or bar 20 by the locking pins or buttons 27 which are grooved at 42 and 42' to engage with the bottom portions 43 and 43' of the plates 31 and 31', the plates being adapted to be spread apart sufficiently for the portions 43 and 43' to pass over the ends of the button 27 when the device 30 is positioned on the support plate 20 and the portions 43 and 43' being apertured at 44 and 44' to accommodate the ends of the button 27 as shown in FIGURES 4, 5 and 6.

In using the apparatus, the lengths of stuffed casing 11 are fed so that they are laid in the V-shaped slots 36 defined by the edges 37 and 37' of the neck forming or casing constricting devices 30 and the successive cross bar assemblies 18 are advanced by movement of the conveyor 10 to the linking station (FIGURE 1) where they are disposed beneath the vertically reciprocating cross bar 45 (FIGURE 3) on the frame 14. The cross bar 45 has a plurality of transversely spaced pairs of depending plates 46 which have downwardly opening V-shaped slots 47 in their lower ends. The slots 47 in each pair of plates 46 are aligned in the longitudinal direction of the conveyor 10 (FIGURE 3) and each pair of plates 46 is positioned on the cross bar 45 to place the slots 47 in alignment with a slot 36 in a neck forming device 30 on an assembly 18 as the latter is brought into vertical alignment or register beneath the cross bar 45 (FIGURE 5). The cross bar 45 is reciprocated vertically by a suitable mechanism (not shown) in timed relation to the movement of the cross bar assemblies on the conveyor 10 so as to move the neck forming plates 46 into straddling relation with the casing constricting devices 30 on each successive assembly 18. The bar 45 is moved downwardly a sufficient distance to force the stuffed casings 11 down through the slots 38 into the necking pockets 40 of the casing constricting and holding devices 30 where the constricted portions 41 (FIGURE 6) of the casings are held in the pockets 40 of the devices 30 while the necking plates 46 are raised and the conveyor 10 advances the links 12 beyond the linking station and through the processing apparatus.

While particular materials and specific details of construction are referred to in describing the illustrated form of the invention, it will be understood that other materials and different details of construction may be resorted to within the spirit of the invention.

I claim:
1. In a machine for linking stuffed sausage casing, a traveling conveyor having cross bar assemblies spaced apart longitudinally thereof a distance corresponding to the length of link desired, which cross bar assemblies each comprise a transversely extending support bar having one or more notches cut in its outer margin, each of which notches provides an outwardly opening, generally V-shaped slot defined by inwardly converging edges which terminate in spaced relation and merge into a semi-circular pocket formation, and a casing constricting and holding device removably mounted in said V-shaped slot, said casing constricting and holding device including a pair of generally V-shaped plates disposed in face-to-face parallel relation and spaced so as to straddle said support bar, said plates having outer portions forming the legs of the V which are encased in a sheath of rubber-like material so as to provide an outwardly opening V-shaped slot of smaller size than the V-shaped slot in the support bar, said last mentioned slot being defined by inwardly converging edge formations which terminate at a slit formation providing an entrance to a pocket for receiving and retaining therein a constricted portion of a casing when said casing is forced downwardly into the V-shaped slot in the sheath and through said slit formation, said plates having inner portions which are positioned along opposite surfaces of said support bar inwardly of the notched outer margin thereof and releasable means associated with said inner portions of said plates and said support bar for frictionally retaining said casing constricting and holding device in the slot in said support bar.

2. In a machine for linking stuffed sausage casing, a traveling conveyor having laterally spaced chains and transversely extending, parallel cross bar assemblies mounted thereon which are spaced apart a distance corresponding to the length of link desired, said cross bar assemblies each comprising a plate-like support bar having notches in its outer margin which provide outwardly opening, generally V-shaped slots each defined by inwardly converging edges which terminate at the ends of a semi-circular pocket formation, and casing constricting and holding devices adapted to be removably mounted in said V-shaped slots, said casing constricting and holding devices each being formed by a pair of generally V-shaped plates disposed in parallel planes and spaced apart a distance corresponding to the thickness of said support bar so as to straddle said support bar, said plates having outer portions forming the legs of the V which are encased in a sheath of rubber-like material providing an outwardly opening, V-shaped slot, said last mentioned slot being defined by inwardly converging edge formations which terminate at a slit formation, said slit formation being relatively small and providing an entrance to a cylindrical pocket for receiving and retaining therein a constricted portion of a casing when said casing is forced downwardly into the V-shaped slot and through said entrance slit, said plates having inner portions which lie along opposite faces of said support bar and inwardly of the outer margin of said support bar when the device is mounted in a V-shaped slot in said support bar, and means for frictionally retaining said casing constricting and holding device in said V-shaped slot.

3. In a machine as recited in claim 2, and said means for retaining said casing constricting and holding device in said V-shaped slot comprising a grooved pin in said support bar and pin accommodating apertures having groove engaging edge portions in said inner portions of said plates.

4. In a machine for linking stuffed sausage casing, a traveling conveyor having laterally spaced, parallel chains and parallel connecting cross bar assemblies spaced apart a distance corresponding to the length of link desired, which cross bar assemblies each comprise a plate-like support bar having notches in its outer margin, each of which notches provides an outwardly opening, inwardly extending, generally V-shaped slot, and a casing constricting and holding device removably mounted in said V-shaped slot, said casing constricting and holding device comprising a pair of generally V-shaped plates disposed in spaced parallel planes so as to straddle said support bar when mounted thereon, said plates having portions forming the legs of the V which have a rubber-like material molded thereon so as to provide relatively flat outer side faces and an outwardly opening V-shaped slot of smaller size than the V-shaped slot in the support bar, which V-shaped slot is defined by inwardly converging edge formations of substantial width, said edge formations terminating at a slit formation providing an entrance to a small cylindrical pocket extending between said outer side faces for receiving and retaining therein a constricted portion of a casing when said casing is forced downwardly into the V-shaped slot and through said entrance slit, said plates having portions at the inner ends of said leg forming portions which lie along opposite faces of said support bar and inwardly of the outer margin thereof when mounted on said support bar and means for retaining said casing constricting and holding device in the V-shaped slot in said support bar.

5. In a machine as recited in claim 4, and said means for retaining said casing constricting and holding device on said support bar comprising a circular aperture in at least one of said plates and a locking pin on said support bar for engaging in said aperture.

6. In a machine as recited in claim 4, and said V-shaped plates being of relatively thin metal with portions of the rubber-like material forming a sheath thereon.

7. In a sausage linking apparatus, a casing constricting and holding device adapted to be mounted on a support and having an upwardly opening, V-shaped slot for receiving a portion of a stuffed sausage casing and for constricting the casing into a neck forming portion when it is forced down into said V-shaped slot, said device comprising a pair of relatively thin metal plates disposed in spaced parallel planes and having transversely aligned, V-shaped slots formed by inwardly converging edges, the margins of said plates at said converging edges being encased in a sheath of rubber-like material which is molded thereon so as to provide a V-shaped casing gathering slot defined by inwardly converging edge formations of substantial width, said edge formations extending between relatively flat side faces and terminating at the outer end of a short passageway having the form of a slit and providing an entrance to a cylindrical pocket of relatively small diameter, which extends between the side faces of the rubber sheath, said passageway causing a neck to be formed in the casing when the gathered casing is forced through said passageway and into the pocket where it is frictionally held.

References Cited by the Examiner
UNITED STATES PATENTS

| | | | |
|---|---|---|---|
| 2,054,875 | 9/36 | Corey | 17—34 |
| 3,042,963 | 7/62 | Runge | 17—34 |
| 3,059,272 | 10/62 | Millenaar | 17—34 |

SAMUEL KOREN, *Primary Examiner.*

LUCIE H. LAUDENSLAGER, *Examiner.*